United States Patent
Liu

(12) 
(10) Patent No.: US 6,359,216 B1
(45) Date of Patent: Mar. 19, 2002

(54) ELECTROMAGNETIC WAVE SHIELD PAD FOR MOBILE PHONE

(76) Inventor: Chi-Yun Liu, 2Fl. No. 1-1, Lane 84, Szu-Wei Rd., Taipei (TW)

(*) Notice: Subject to any disclaimer, the term of this patent is extended or adjusted under 35 U.S.C. 154(b) by 0 days.

(21) Appl. No.: 09/606,199

(22) Filed: Jun. 29, 2000

(51) Int. Cl.⁷ .................................................. H05K 9/00
(52) U.S. Cl. ..................... 174/35 R; 455/90; 455/117
(58) Field of Search ........................ 174/35 R, 35 MS; 361/816, 818; 379/437, 439, 447, 451, 452; 455/117, 90, 575, 128, 129

(56) References Cited

U.S. PATENT DOCUMENTS

| | | | | |
|---|---|---|---|---|
| 5,444,866 A | * | 8/1995 | Cykiert ........................ 455/89 |
| 5,535,439 A | * | 7/1996 | Katz ........................... 455/117 |
| 5,819,162 A | * | 10/1998 | Spann et al. ................... 455/90 |
| 5,995,854 A | * | 11/1999 | Wilson ......................... 455/575 |
| 6,219,419 B1 | * | 4/2001 | Chen ........................... 379/452 |

* cited by examiner

Primary Examiner—Anthony Dinkins
Assistant Examiner—Carmelo Oliva

(57) ABSTRACT

An electromagnetic (EM) wave shield device including an upper pad including a central hole and a bottom adhesive surface, a lower pad including a central hole, a top adhesive surface, and a bottom adhesive surface glued to the earpiece of a mobile phone, and a metal mesh for shielding EM waves having a diameter smaller than pads, while larger than that of central holes so as to be glued and secured between pads. With this, when an incoming call is received, there is no or little EM waves outside the glued shield device to thereby prevent the brain of a mobile phone user from being hurt by EM waves.

7 Claims, 5 Drawing Sheets

ELECTROMAGNETIC WAVE SHIELD PAD FOR MOBILE PHONE

BACKGROUND OF THE INVENTION

1. Field of the Invention

The present invention relates to mobile phones and more particularly to an electromagnetic wave shield pad adhered to the earpiece of mobile phone.

2. Description of Related Art

Mobile phones have been popular worldwide recently. It is a very convenient portable communication means. However, there are a number of drawbacks discovered in recent years associated with mobile phone. For example, there is a great concern about whether electromagnetic (EM) waves emitted from earpiece in response to an incoming call may threaten the health of the person who answers the call in this case. This concern is generally based on a plurality of medical reports, which state that brain of a frequent mobile phone user may be hurt. This is because ear always contact or near the earpiece in order to hear the incoming call clearly, while EM waves near the earpiece is the strongest in such a case. As a result, brain maybe hurt.

Thus, it is desirable to provide a novel EM wave shield device for mobile phone in order to provide a sufficient protection to the brain of mobile phone user.

SUMMARY OF THE INVENTION

It is an object of the present invention to provide an electromagnetic (EM) wave shield device having an absorption of metal mesh to prevent the brain of a mobile phone user from being hurt by the direct emission of EM wave from earpiece when an incoming call is received.

It is another object of the present invention to provide an EM wave shield device glued to the earpiece of a mobile phone in which the shield device further comprises a wave absorption member provided between metal mesh and lower pad for enhancing the EM waves absorption capability.

It is a further object of the present invention to provide an EM wave shield device glued to the earpiece of a mobile phone wherein advertising or any of other pretty patterns is printed on the top annular surface for calling the public's attention.

To attain the purposes and features mentioned above, the shield device of the present invention comprises an upper pad including a central hole for facilitating sound waves to pass through, a smooth top annular surface, and a bottom annular adhesive surface; a lower pad including a central hole corresponding to the central hole of upper pad, a top annular adhesive surface, and a bottom annular adhesive surface glued to the earpiece of a mobile phone; and a metal mesh for shielding EM waves having a diameter smaller than pads, while larger than that of central holes so as to be glued and secured between pads. With this, there is no or little EM waves outside the glued shield device when an incoming call is received due to the absorption of metal mesh, resulting in a prevention of the brain of a mobile phone user from being hurt by the direct emission of EM waves from earpiece.

The above and other objects, features and advantages of the present invention will become apparent from the following detailed description taken with the accompanying drawings.

DETAILED DESCRIPTION OF THE PREFERRED EMBODIMENTS

Figure 1:
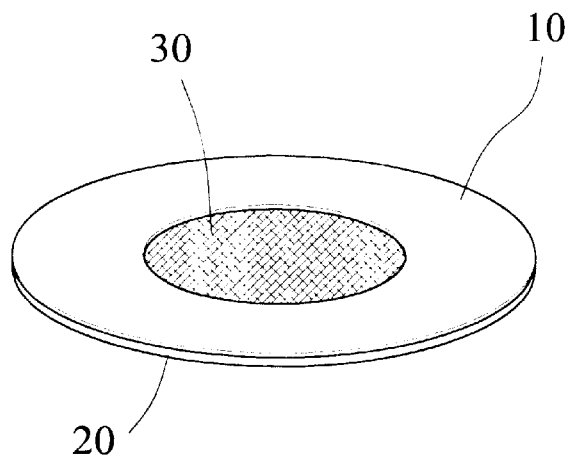
FIG. 1 is a perspective view of a first preferred embodiment of electromagnetic wave shield pad for mobile phone according to the invention.
Figure 2:
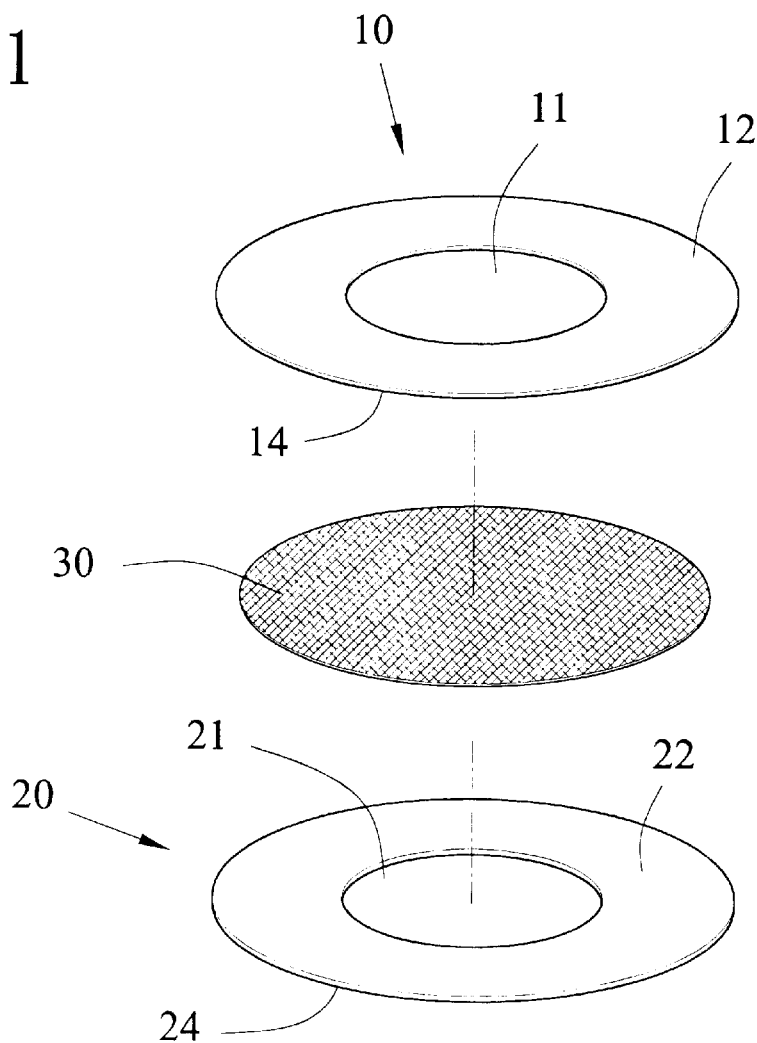
FIG. 2 is an exploded view of FIG. 1.
Figure 3:
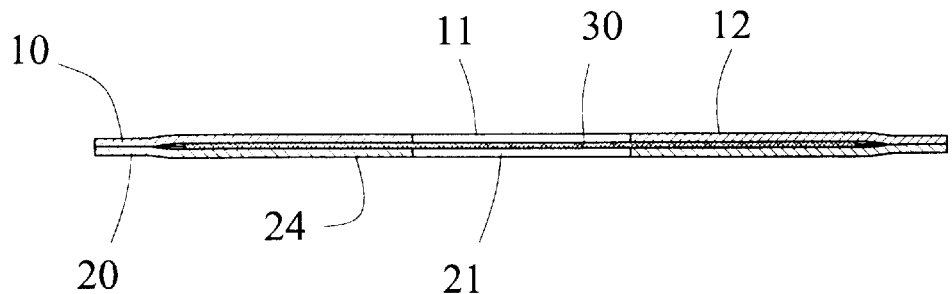
FIG. 3 is a cross-sectional view of FIG. 1.

Referring to FIGS. 1 to 3, there is shown an electromagnetic (EM) wave shield device for mobile phone constructed in accordance with the invention. The device comprises an upper pad 10, a lower pad 20, and a metal mesh 30. Each of above component is detailed below.

Upper pad 10 comprises a central hole 11 for facilitating sound waves to pass through, a smooth top annular surface 12 with advertising or any of other pretty patterns printed thereon, the top annular surface 12 being made of electro luminescent material in one embodiment for emitting light in a dark environment or made of color-changing material sensitive to the variation of temperature in the other embodiment so as to change color for reminding user to cut short of talk when a sufficient time of contact with ear is reached, and a bottom annular adhesive surface 14.

Lower pad 20 is about the same shape and size as upper pad 10. Lower pad 20 comprises a central hole 21 corresponding to central hole 11 for facilitating sound waves to pass through, a top annular adhesive surface 22 corresponding to the bottom annular surface 14, and a bottom annular adhesive surface 24. This bottom annular adhesive surface 24 has the feature of quick fastening/unfastening to earpiece of mobile phone.

The circular metal mesh 30 has the feature of shielding EM waves. Metal mesh 30 has a diameter smaller than pads 20 and 40, while larger than that of holes 11 and 21 so as to be glued and secured between upper and lower pads 10 and 20.

Figure 4:
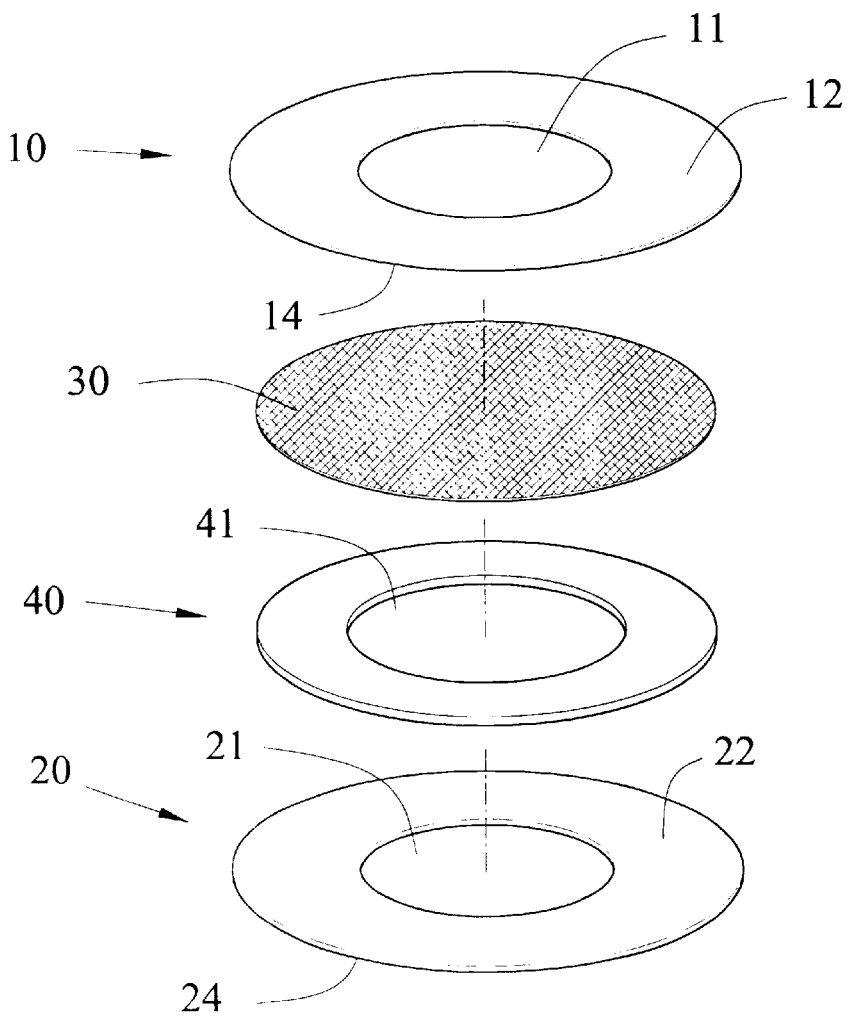
FIG. 4 is an exploded view of a second preferred embodiment of electromagnetic wave shield pad for mobile phone according to the invention.
Figure 5:
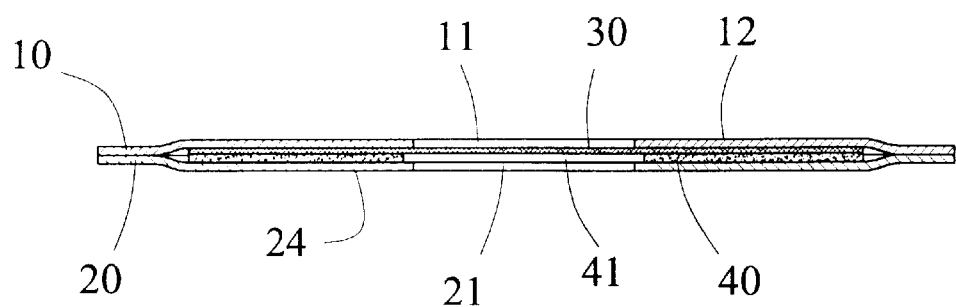
FIG. 5 is a cross-sectional view of FIG. 4.

Referring to FIGS. 4 and 5, there is shown a second preferred embodiment of the invention. There is a wave absorption member 40 additionally provided between metal mesh 30 and lower pad 20. Wave absorption member 40 is an annular member having a central hole 41 larger than other two central holes 11 and 21 beside thereof for facilitating sound waves to pass through. Wave absorption member 40 is made of magnetic metal powder capable of absorbing EM waves emitted by mobile phone.

Figure 6:
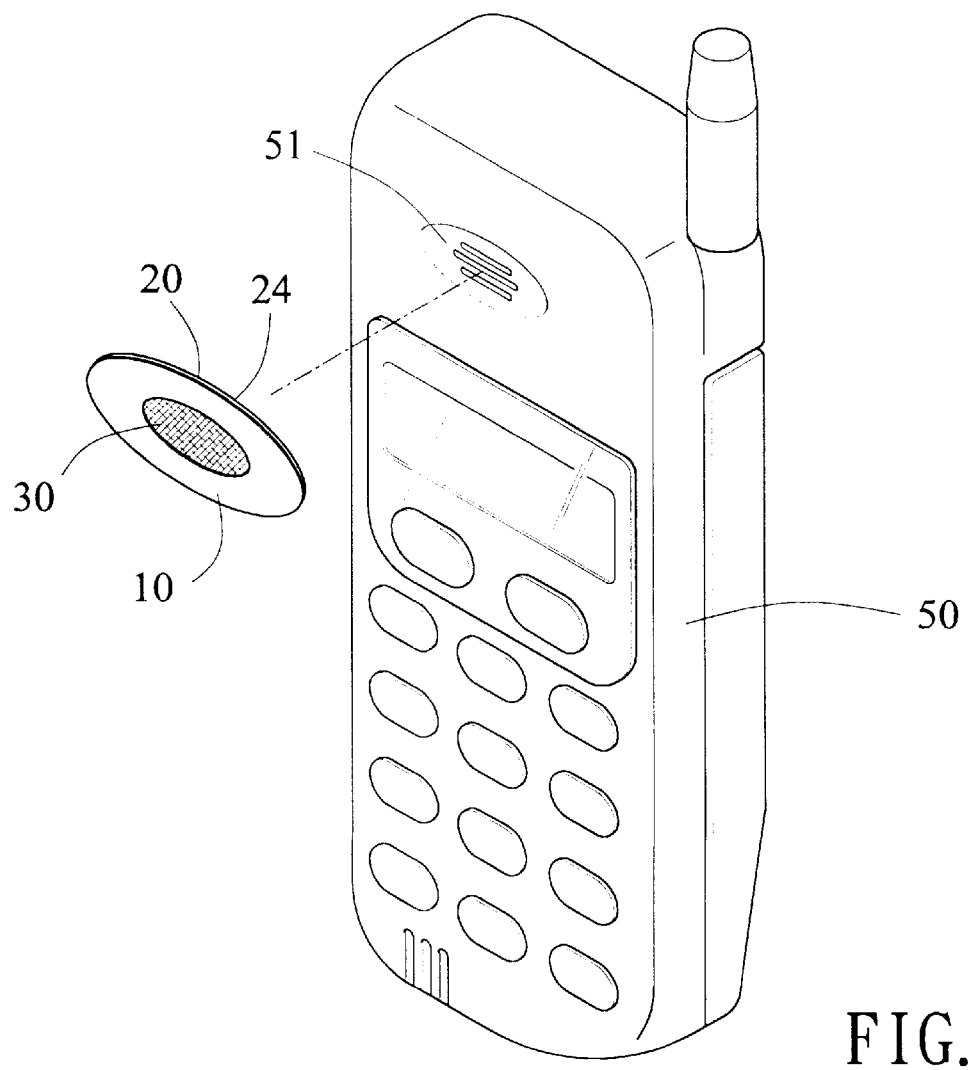
FIG. 6 is an environmental view showing the pad being mounted to mobile phone.
Figure 7:
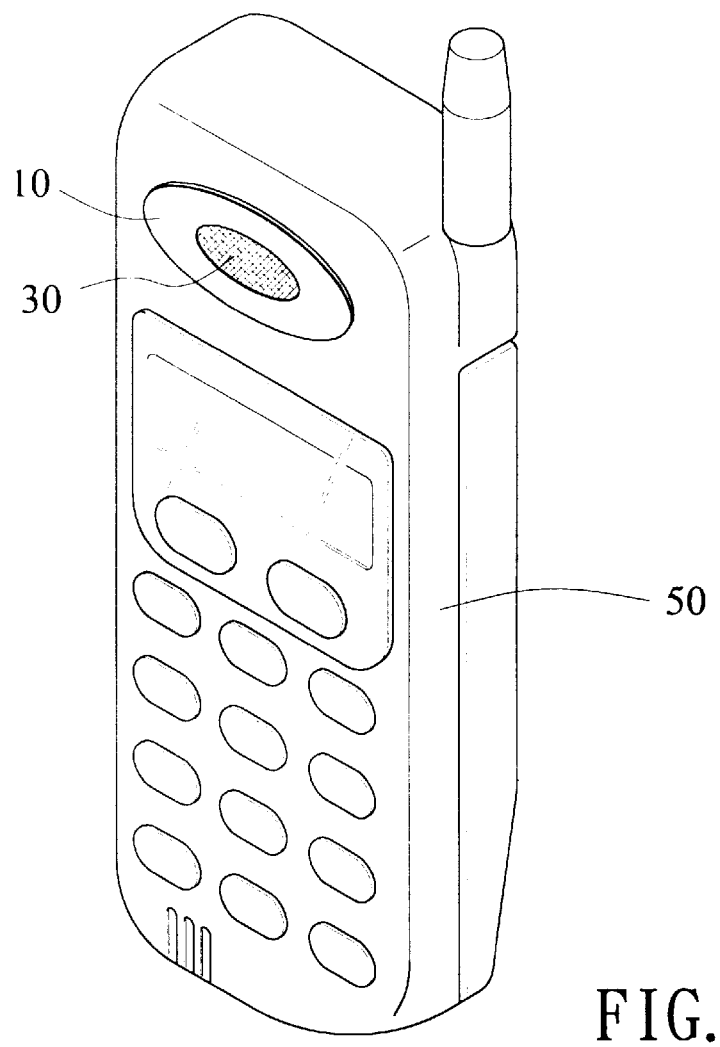
FIG. 7 is similar to FIG. 6 where the pad adhered to earpiece of mobile phone.

Referring to FIGS. 6 and 7, the mounting of the shield device of the invention to mobile phone is illustrated. It is seen that bottom annular adhesive surface 24 of lower pad 20 is glued to earpiece 51 of mobile phone 50. As such, there is no or little EM waves outside the glued shield device when an incoming call is received due to the absorption of metal mesh 30 and wave absorption member 40. As a result, the brain of a mobile phone user may not hurt by the direct emission of EM waves from earpiece 51.

Figure 8:
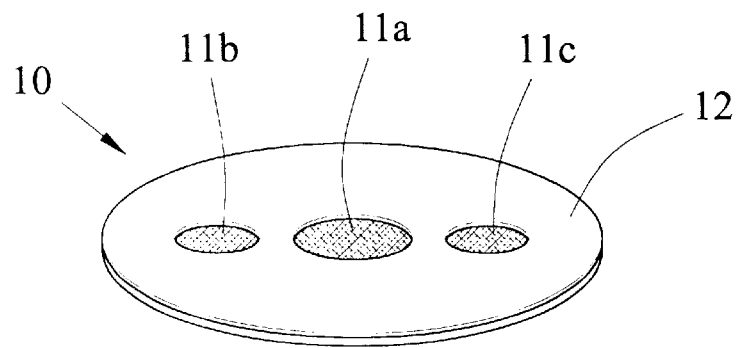
FIG. 8 is a perspective view of a third preferred embodiment of electromagnetic wave shield pad for mobile phone according to the invention wherein upper pad has a plurality of holes.

Referring to FIG. 8, there is shown a third embodiment of the invention wherein upper pad 10 has a main central hole 11a and two smaller holes 11b and 11c for facilitating sound waves to pass through.

Figure 9:
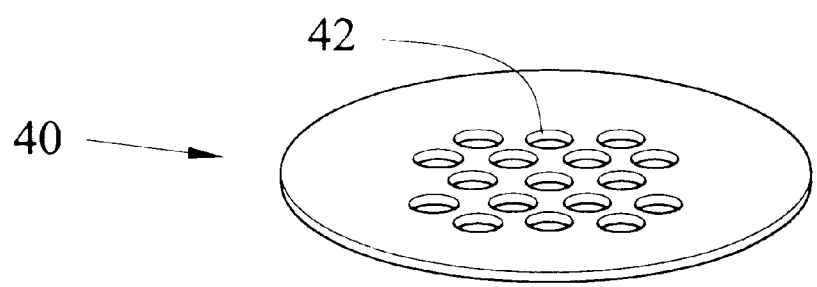
FIG. 9 is a perspective view of a fourth preferred embodiment of electromagnetic wave shield pad for mobile phone according to the invention wherein wave absorption member has multiple holes.
Figure 10:
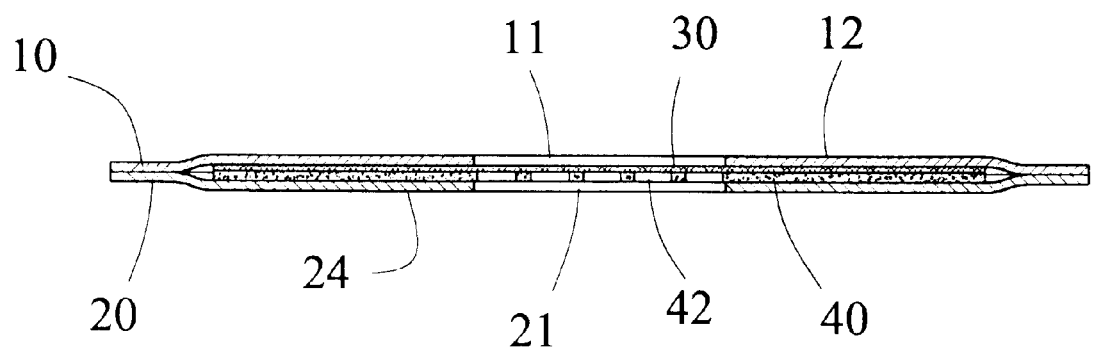
FIG. 10 is cross-sectional view of FIG. 9.

Referring to FIGS. 9 and 10, there is shown a fourth embodiment of the invention wherein wave absorption member 40 has a plurality of holes 42 in the central area.

While the invention herein disclosed has been described by means of specific embodiments, numerous modifications and variations could be made thereto by those skilled in the art without departing from the scope and spirit of the invention set forth in the claims.

What is claimed is:

1. An electromagnetic (EM) wave shield device for a mobile phone comprising:

an upper pad including a central hole for facilitating sound waves to pass through, a top annular surface, and a bottom annular adhesive surface;

a lower pad including a central hole corresponding to the central hole of the upper pad, a top annular adhesive surface, and a bottom annular adhesive surface glued to an earpiece of the mobile phone; and a metal mesh for shielding EM waves having a diameter smaller than the upper and the lower pads, while having a diameter larger than that of both the central holes of the upper and the lower pads so as to be glued and secured between the upper and the lower pads;

whereby EM waves outside the glued shield device are substantially absorbed or shielded when an incoming call is received.

2. The EM wave shield device of claim 1, further comprising a wave absorption member provided between the metal mesh and the lower pad.

3. The EM wave shield device of claim 2, wherein the wave absorption member comprises a central hole.

4. The EM wave shield device of claim 2, wherein the wave absorption member further comprises a plurality of small holes provided around a central portion thereof.

5. The EM wave shield device of claim 1, wherein the upper pad further comprises the central hole having a diameter smaller than the central hole of the lower pad and two small holes beside thereof.

6. The EM wave shield device of claim 1, wherein the top annular surface is made of an electroluminescent material for emitting light in a dark environment.

7. The EM wave shield device of claim 1, wherein the top annular surface of the upper pad is made of a predetermined material sensitive to temperature so as to change the color of the top annular surface when a predetermined time of contact of the top annular surface with a human being is reached.

* * * * *